Feb. 2, 1937.  J. PEYSER  2,069,503
METHOD OF AND MEANS FOR ASSEMBLING ARTICLES
Original Filed March 15, 1935   8 Sheets-Sheet 4

INVENTOR
Joseph Peyser
BY
ATTORNEY

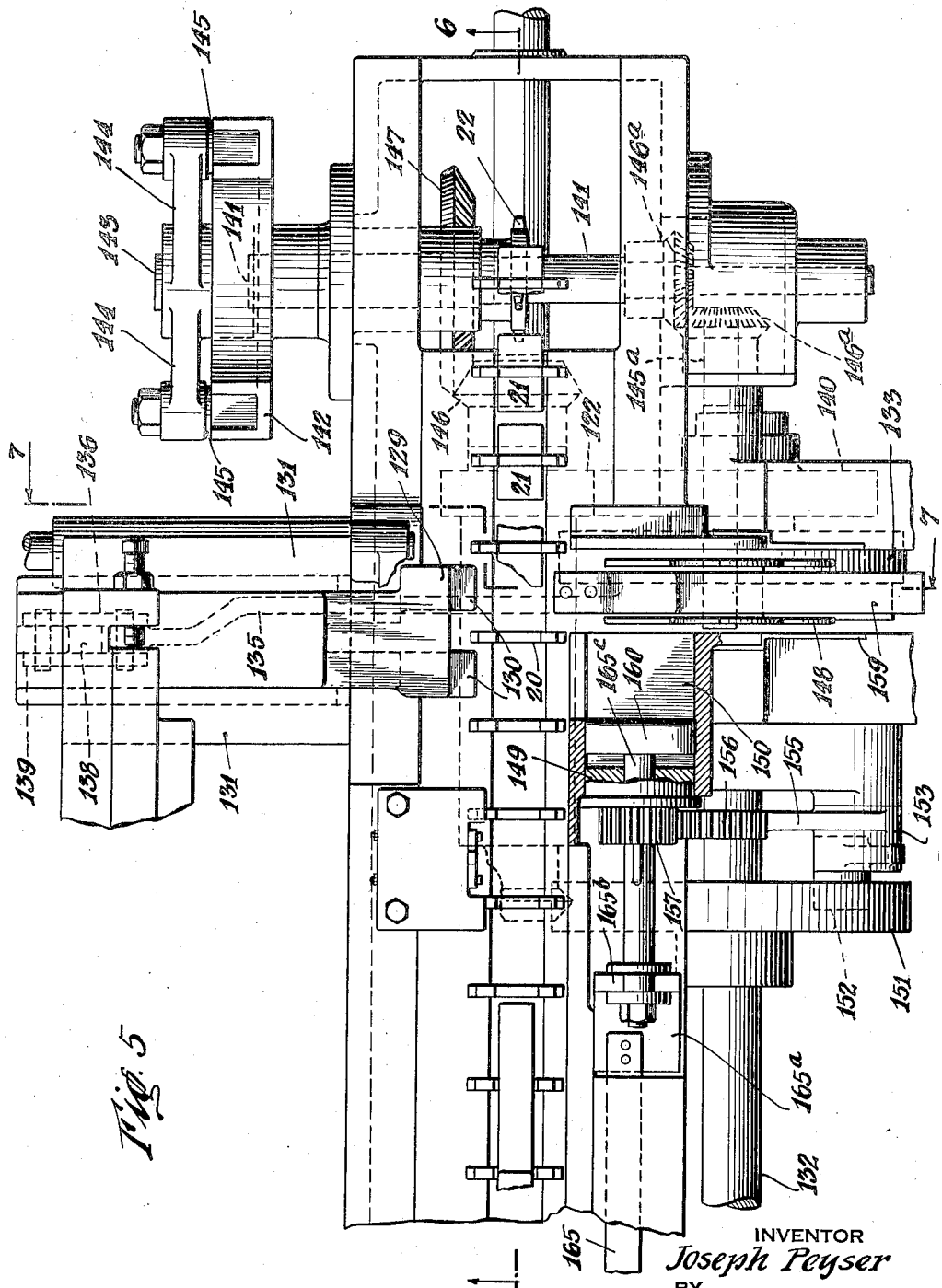

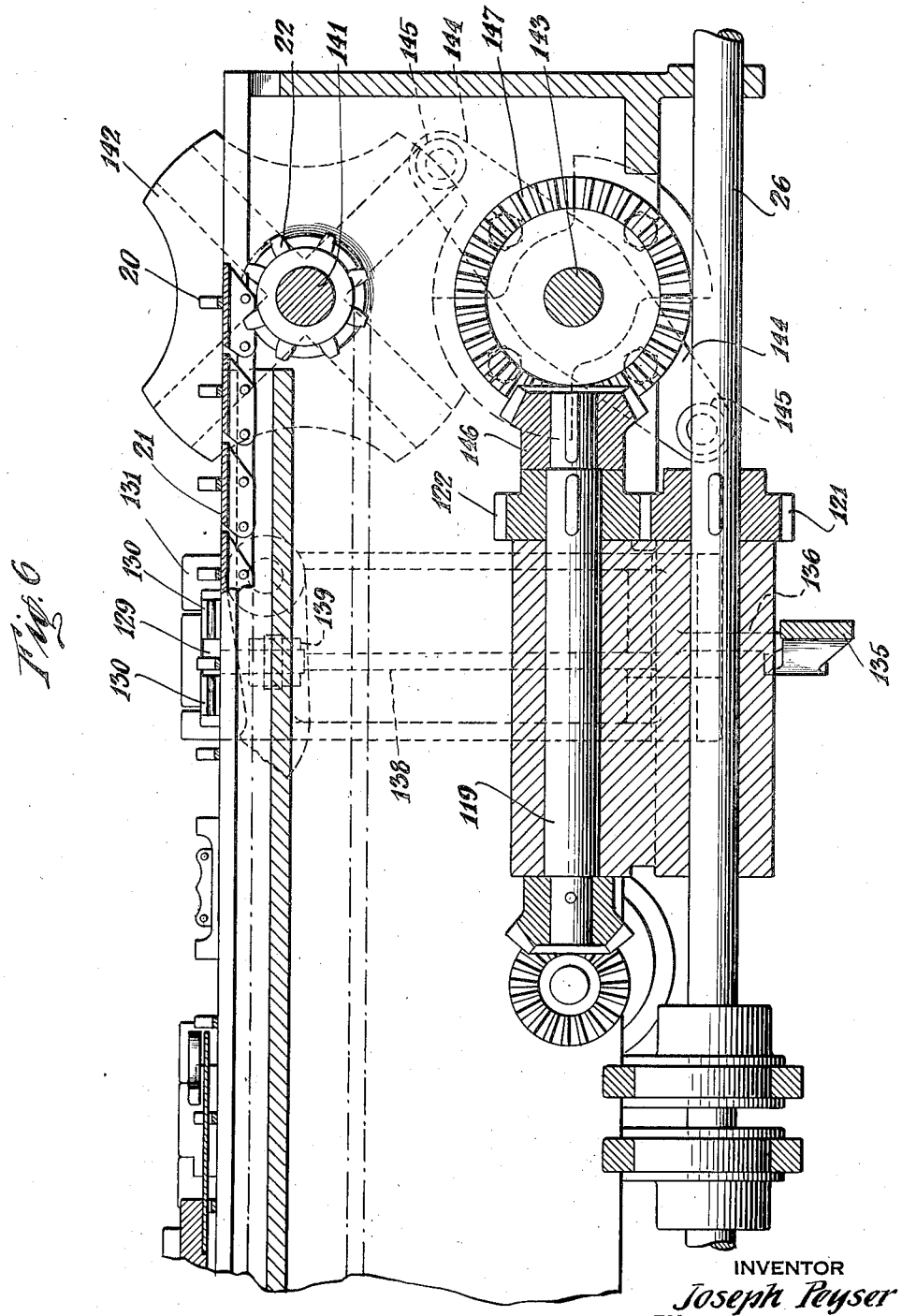

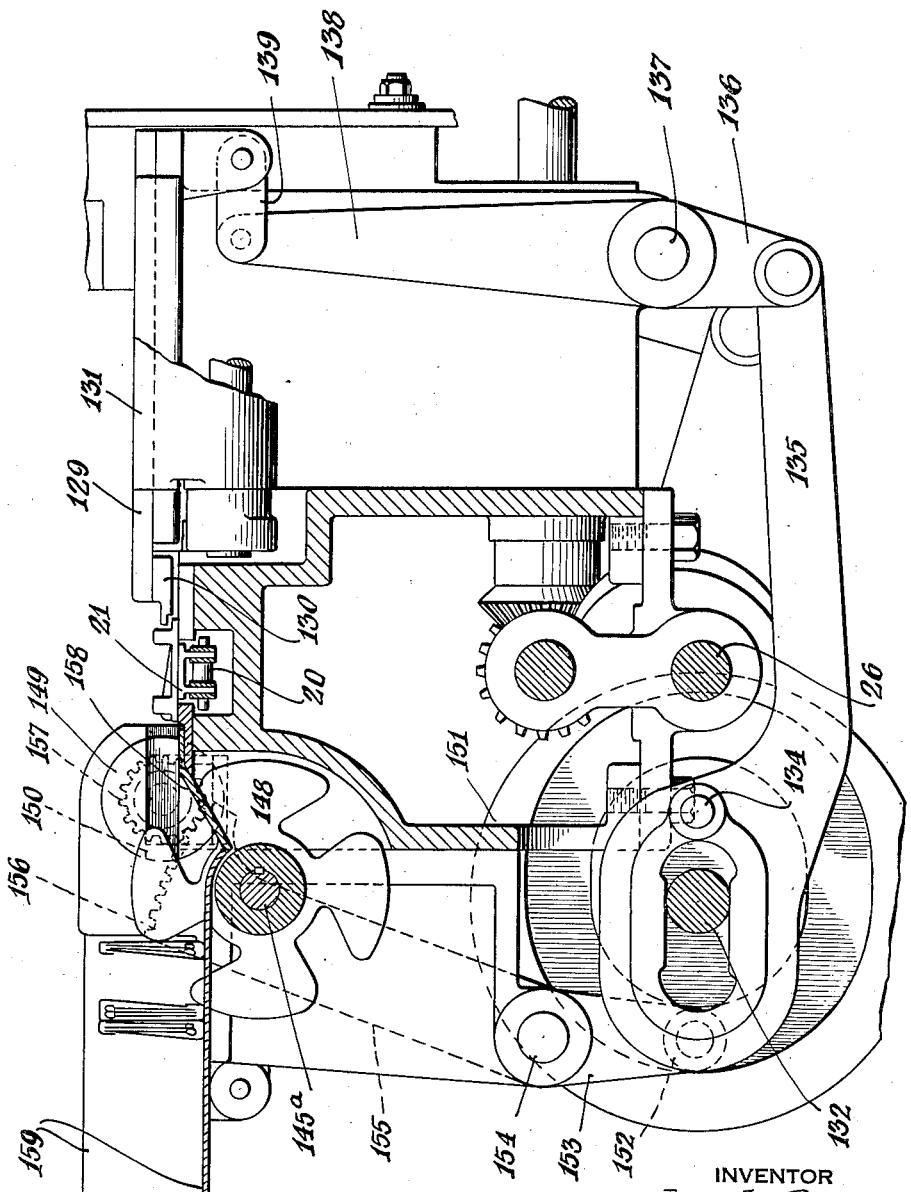

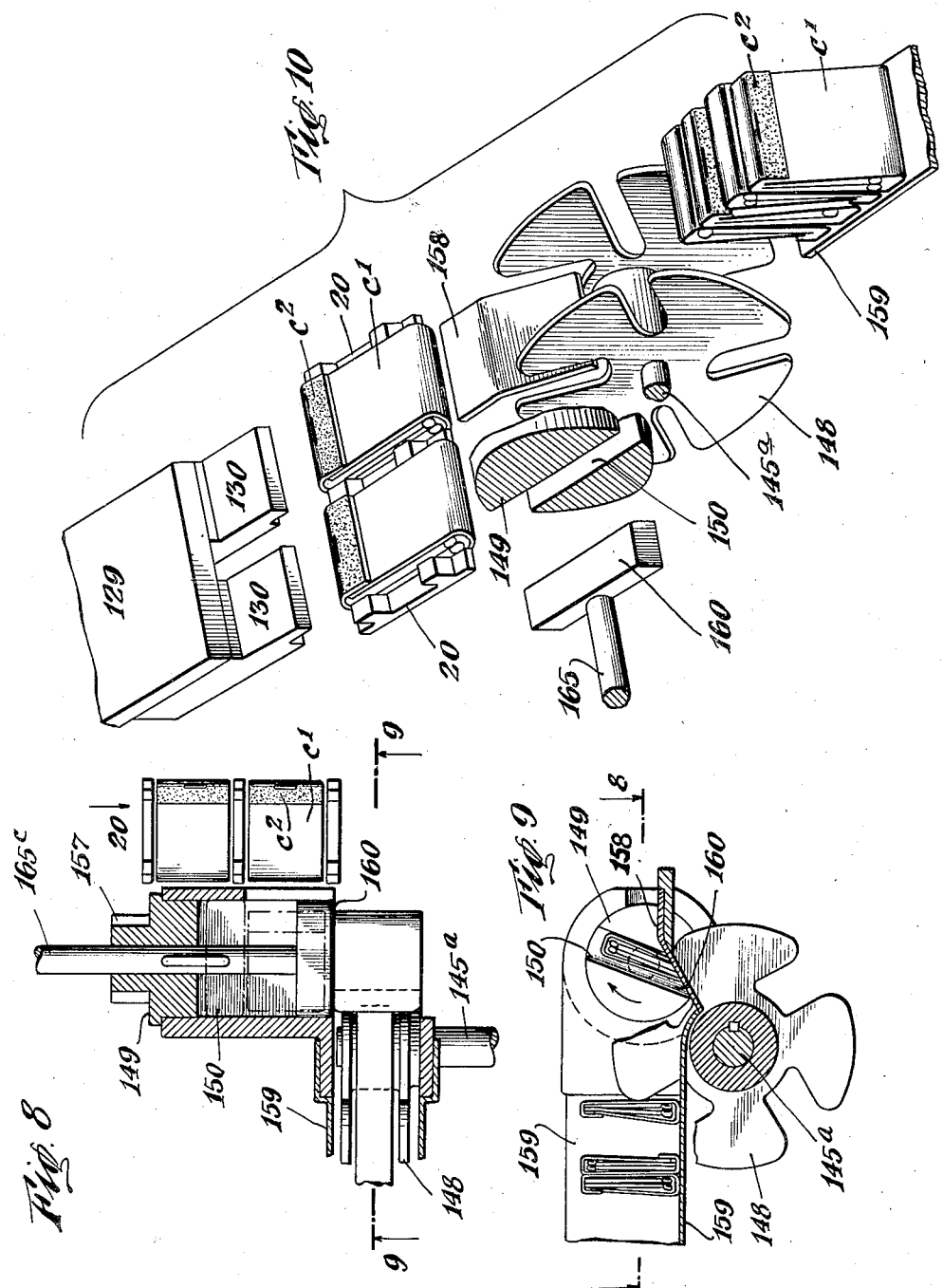

UNITED STATES PATENT OFFICE 2,069,503

METHOD OF AND MEANS FOR ASSEMBLING ARTICLES

Joseph Peyser, Mount Vernon, N. Y.

Original application March 15, 1935, Serial No. 11,269. Divided and this application November 5, 1935, Serial No. 48,281

6 Claims. (Cl. 226—4)

This invention relates to methods of and means for assembling match-books and similar articles in series, and has as its object the provision of a simple and efficient arrangement for placing such articles in sequence with alternate articles in reversed position.

This application is a division of application Ser. No. 11,269 filed March 15, 1935 for Methods of and means for producing match-books.

In the accompanying drawings, the invention is shown in a concrete and preferred form in connection with a match-book-forming machine, in which:

Fig. 5 is an enlarged plan view of the right-hand end of Fig. 2, parts being broken away;

Fig. 6 is a vertical longitudinal sectional view substantially on the plane of line 6—6 of Fig. 5;

Fig. 7 is a transverse vertical sectional view substantially on the plane of line 7—7 of Fig. 5;

Fig. 8 is a horizontal sectional view of the reversing mechanism substantially on the plane of line 8—8 of Fig. 9;

Fig. 9 is a vertical sectional view substantially on the plane of line 9—9 of Fig. 8; and Fig. 10 is a diagrammatic perspective view showing the assembling operations.

Figure 1:
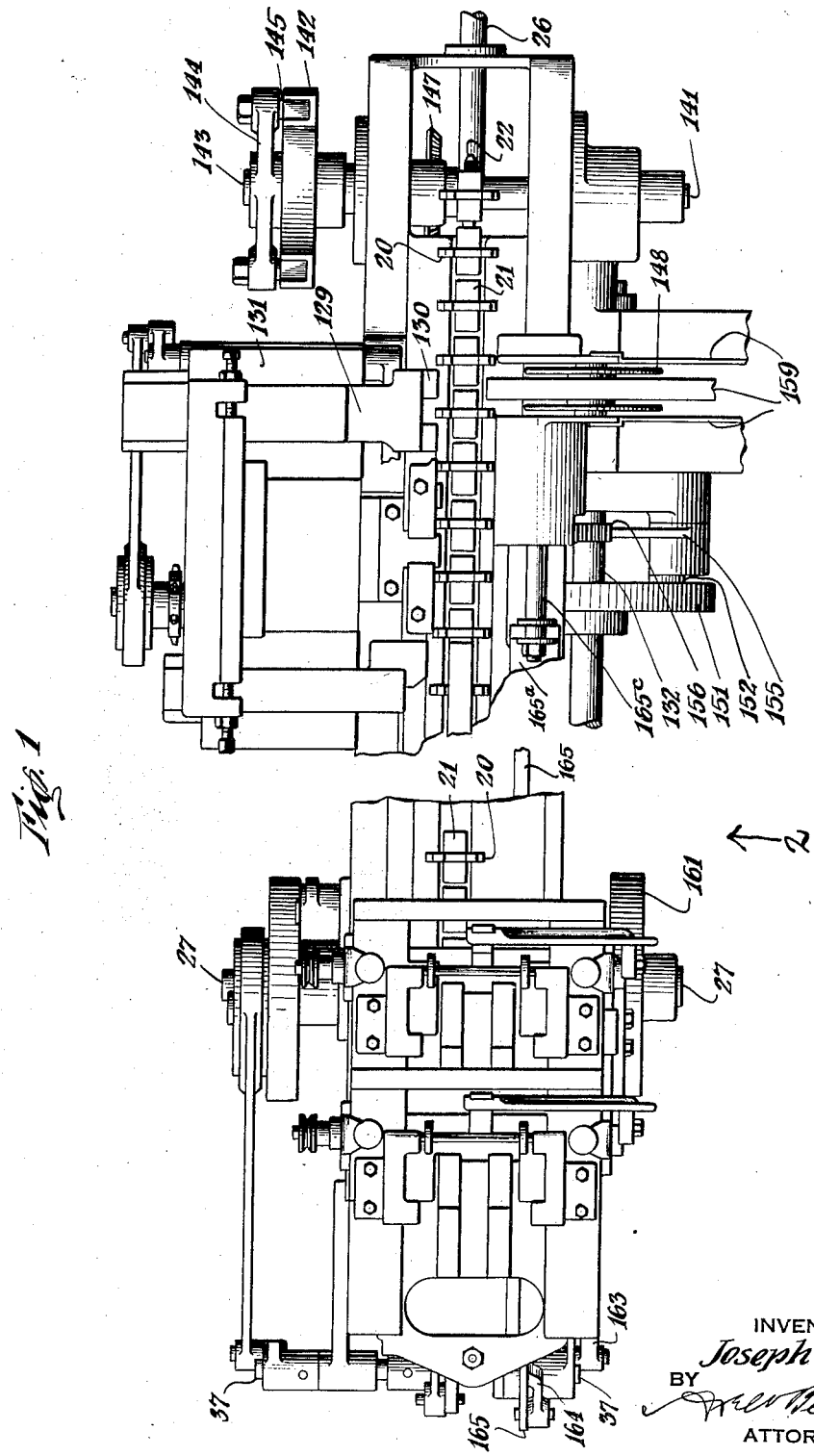
Fig. 1 is a top-plan view of the machine with parts broken away.
Figure 2:
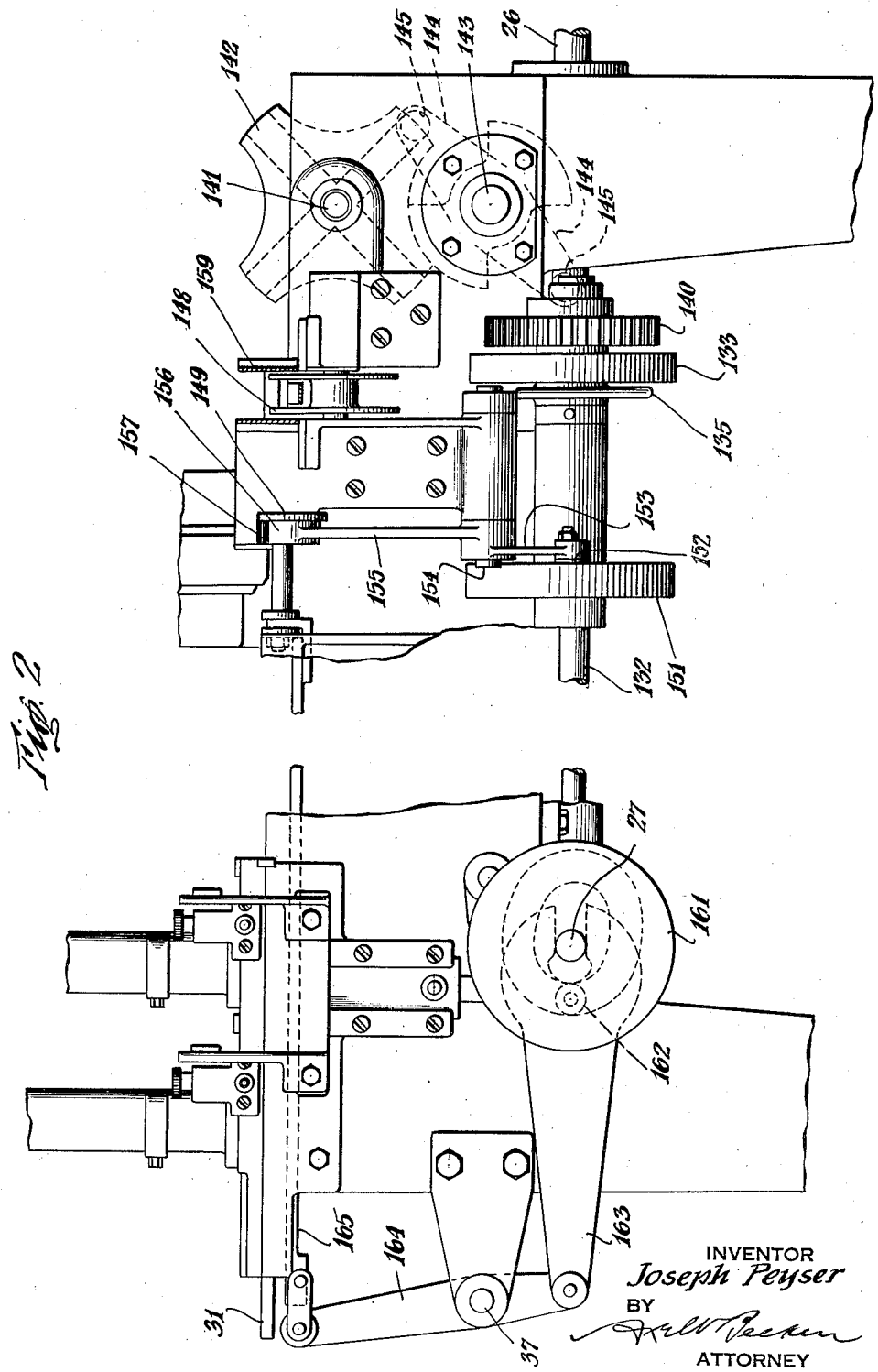
Fig. 2 is a view in side elevation, with parts broken away, looking in the direction of arrow 2 in Fig. 1.
Figure 3:
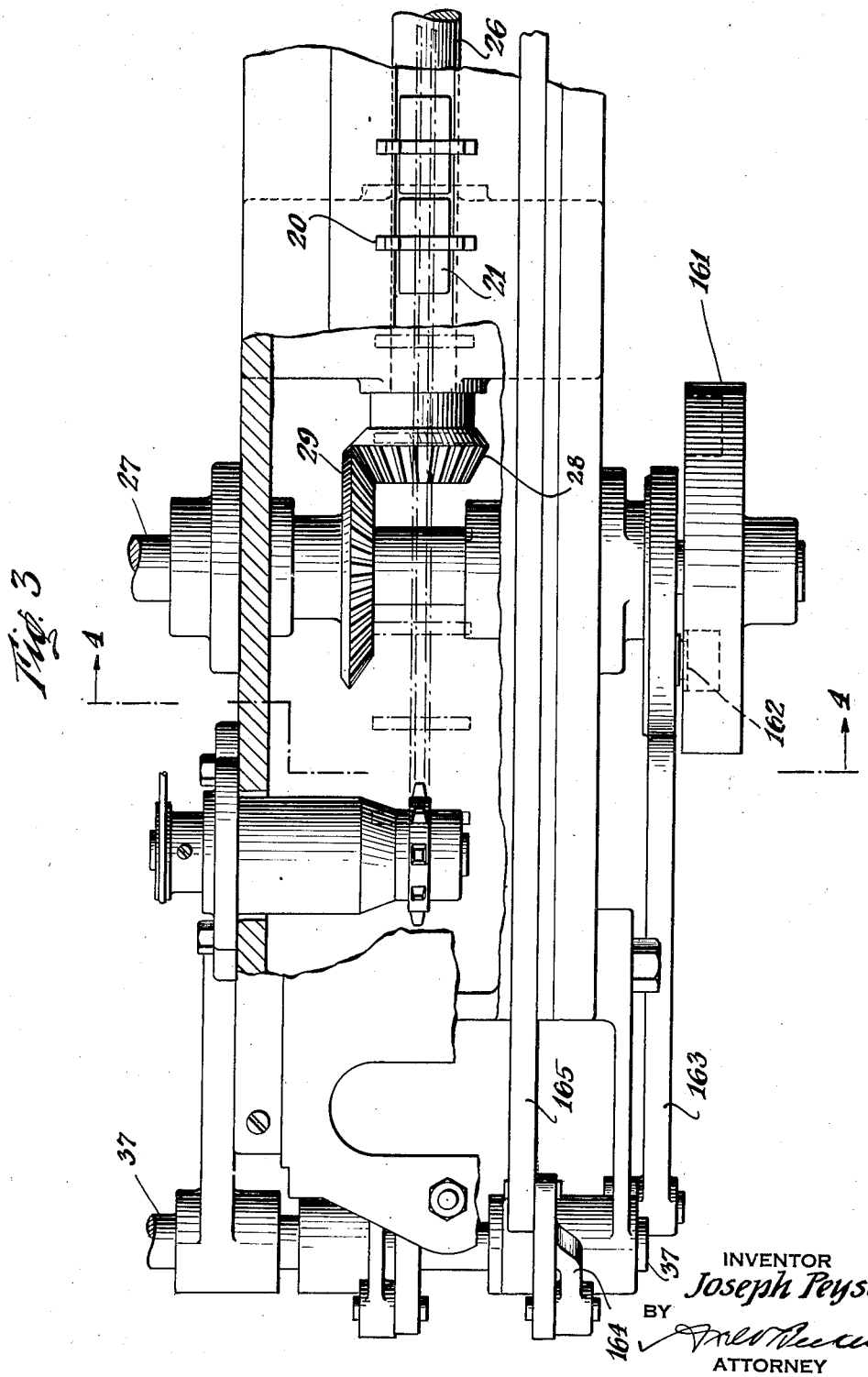
Fig. 3 is a plan view of the feed end of the machine with top and rear portions broken away.
Figure 4:
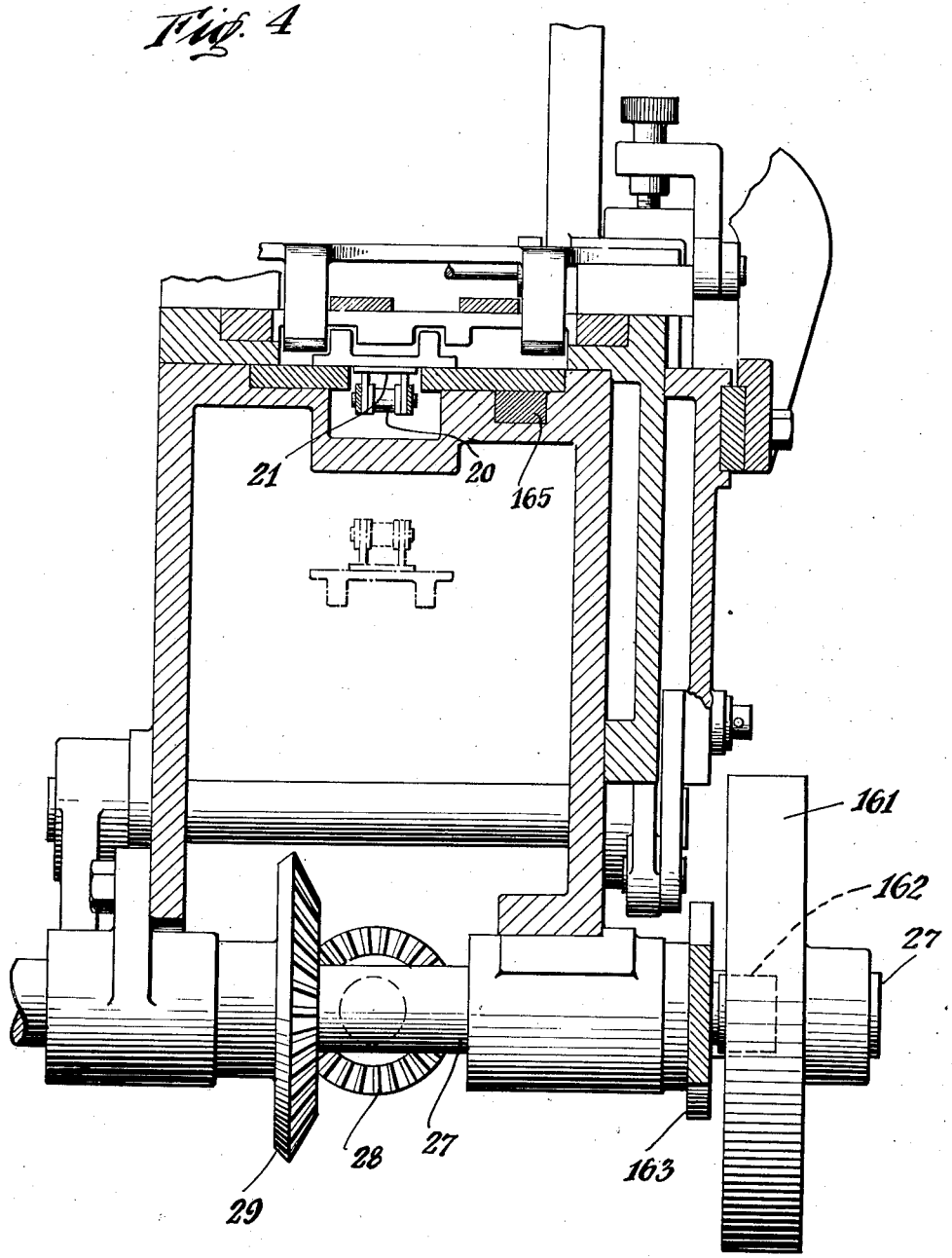
Fig. 4 is a transverse vertical sectional view substantially on the plane of line 4—4 of Fig. 3.

20 indicates a conveyer here in the form of an intermittently movable sprocket chain having blank or cover supporting compartments or surfaces 21, said chain being trained over sprockets 22 and 23 at opposite ends of the machine. Arranged alongside this conveyer are the various instrumentalities or mechanisms for associating cover blanks and match-combs; and for convenience they have been omitted, being shown in detail in the above-mentioned application. Extending longitudinally through the machine is main shaft 26 that here makes one revolution to each cycle of the machine, i. e. to each match-book produced. 27 is a cross-shaft deriving its motion from 26 by means of bevel gears 28 and 29 (Figs. 2 and 3) and it will be seen that the gear ratio is such that shaft 27 makes one revolution to every two revolutions of 26.

129 is a match-book-ejecting device having two ejecting members 130 so as to simultaneously eject two completed match-books, and is in the form of a transverse horizontal slide moving in guides 131. This slide receives its motion from shaft 132 carrying a cam 133 with which engages a cam roller 134 mounted on arm 135 pivotally connected by arm 136 to rock-shaft 137, from which latter extends an arm 138 pivotally connected by means of link 139 to slide 129. Shaft 132 makes one revolution to each two revolutions of main shaft 26 and is driven from the latter by spur gears 121 and 140.

Conveyer 20 is advanced intermittently one step to each revolution of the main shaft by any suitable means such as the following: sprocket 22 is secured to shaft 141 to which latter is also secured slotted member 142 of a Geneva stop motion device. Mounted on shaft 143 is a two-armed member 144 carrying rollers 145 to engage with the slots in member 142. Shaft 143 is driven from shaft 119 by means of bevel gears 146 and 147. Shaft 119 makes one revolution to each revolution of main shaft 26, and shaft 143 makes one revolution to each two revolutions of shafts 119, but inasmuch as shaft 143 carries two arms 144, it will be seen that shaft 141, and hence sprocket 22 and conveyer 20, makes two steps to each revolution of shaft 143, and one step to each revolution of main shaft 26.

Shaft 141 drives shaft 145a by means of bevel gears 146a. Mounted on shaft 145a is a rotatable delivery member 148 which latter is thus moved a step to deliver a completed match-book every time conveyer 20 takes a step. Mounted alongside delivery member 148 is a reversing member 149 having a slot 150 for the reception of a match-book. This reversing member is rotated one-half of a revolution once to each two steps of delivery member 148, and is conveniently actuated from shaft 132 (which it will be remembered makes one revolution to each two revolutions of the main shaft) by means of cam 151, cam roller 152, arm 153, rock-shaft 154, arm 155, rack 156 and gear 157, the latter carried by reversing member 149.

As previously explained, ejectors 130 eject two completed match-books at a time from conveyer 20, and one of these passes over guide 158 directly to delivery member 148, while the other passes into slot 150 of reversing member 149. The delivery member thereupon takes a step delivering to trough 159 the match-book which it has received directly from guide 158. The reversing member makes one-half of a revolution thereby reversing the position of the match-book. Transfer device 160 now enters the open slot 150 and transfers a match-book from the reversing member to the delivery member and the latter takes another step while the transfer member is retracted.

Transfer device 160 is actuated from the infeed end of the machine, being driven from shaft 27 by means of cam 161, cam roller 162, arm 163, lever 164 loose on rock-shaft 37 and pivotally connected to rod 165 extending almost the entire length of the machine and secured at its other end to plate 165a. Plate 165a carries a bearing 165b receiving stem 165c of transfer device 160. When the reversing device is rotated, transfer member 160 and stem 165c rotate with it, this action being permitted by bearing 165b.

From the foregoing it will be understood that two articles, such as match-books $C^1$, are delivered side by side with the same ends extending in the same direction and that thereafter the position of one of said articles is reversed after which it is brought in line with the other article. Match-books such as $C'$ have one end thicker than the other, the thick end being the one opposite to the strike-plate $C^2$, and by the method described said books can be stacked more advantageously.

I claim:

1. The method of feeding a plurality of articles with opposite ends of alternate articles extending in a given direction, which consists in: delivering two such articles side by side with the same ends extending in the same direction, and then reversing the position of one of said articles and bringing it in line with the other article.

2. The method of feeding a plurality of articles, one end of which is thicker than the other, with the thick and thin ends of alternate articles extending in a given direction, which consists in: delivering two such articles side by side with the thick ends extending in the same direction, and then reversing the position of one of said articles and bringing it in line with the other article.

3. The method of delivering match-books from a machine for producing them, which consists in: simultaneously delivering two match-books side by side and then reversing the position of one of said books and bringing it in line with the other.

4. A delivery device including: a delivery member; a reversing member alongside of the delivery member; means to deliver an article direct to the delivery member; means to deliver another article to the reversing member; means to reverse the position of the reversing member; and a transfer device to deliver the reversed article from the reversing member to the delivery member.

5. A delivery device including: an intermittently rotatable delivery member; a reversing member alongside of the delivery member; means to deliver an article direct to the delivery member; means to deliver another article to the reversing member; means to reverse the position of the reversing member; a transfer device to deliver the reversed article from the reversing member to the delivery member; and means to rotate the delivery member a step after the receipt of each article.

6. In a match-book machine, a delivery member; a reversing member alongside of the delivery member; means to simultaneously deliver two match-books side by side from said machine, one to the delivery member and the other to the reversing member; means to reverse the position of the reversing member; and a transfer device to deliver the reversed match-book from the reversing member to the delivery member.

JOSEPH PEYSER.